United States Patent [19]

French et al.

[11] Patent Number: 4,526,004
[45] Date of Patent: Jul. 2, 1985

[54] EXHAUST BRAKE VALVE

[75] Inventors: Pierre B. French, Highburton; David L. Antcliffe, Dalton, both of England; Gerald L. Donnellan, Columbus, Ind.

[73] Assignee: Holset Engineering Company Limited, Huddersfield, England

[21] Appl. No.: 545,317

[22] Filed: Oct. 25, 1983

[51] Int. Cl.$^3$ .............................................. F02B 37/00
[52] U.S. Cl. ...................................................... 60/602
[58] Field of Search .................. 60/600, 601, 602, 603

[56] References Cited

U.S. PATENT DOCUMENTS 3,591,959 7/1971 Kubis .................................... 60/324
4,138,849 2/1979 Wilber .................................... 60/602

FOREIGN PATENT DOCUMENTS 996055 6/1965 United Kingdom .................. 60/602

Primary Examiner—Douglas Hart
Attorney, Agent, or Firm—Gary M. Gron; Robert T. Ruff

[57] ABSTRACT

The disclosure illustrates an exhaust brake valve positioned between a divided section exhaust manifold of an internal combustion engine and the divided flow entry to a turbine wheel of a turbocharger used in conjunction with the engine. The valve comprises a closure member displaceable between two positions, the second of which provides separate but free flow from the exhaust manifold sections and the corresponding divided flow entry of the turbine. The closure member, when displaced to the first position, blocks flow to the turbine, but at the same time interconnects the sections of the exhaust manifold. In this condition the engine acts like a compressor working against a blockage to provide a retarding effect, but the manifold interconnection minimizes peak pressure pulses to prevent engine valve bounce.

10 Claims, 12 Drawing Figures

FIG-I

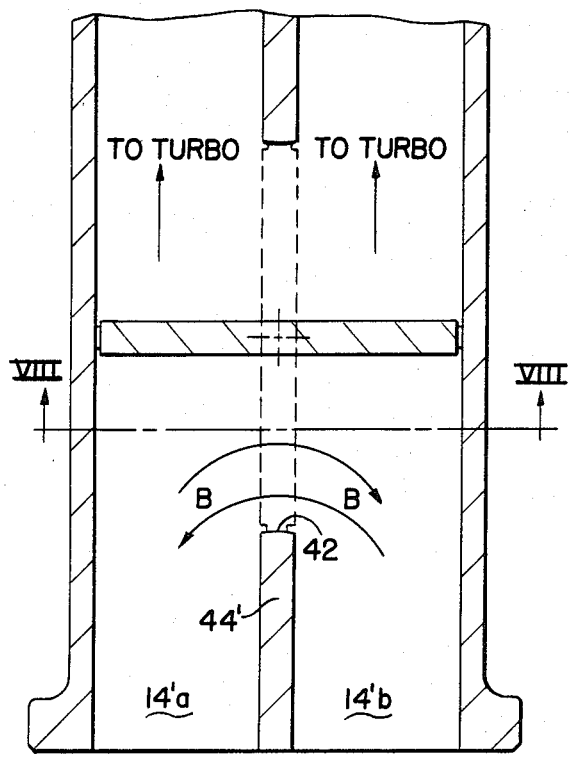
FIG-7
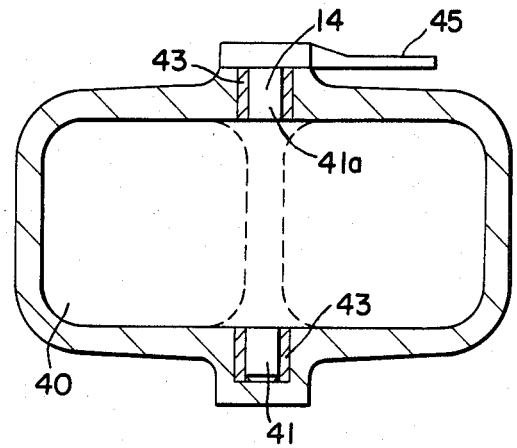
FIG-8
FIG-12
- - - - - WITH TRANSFER PORT
———— WITHOUT TRANSFER PORT
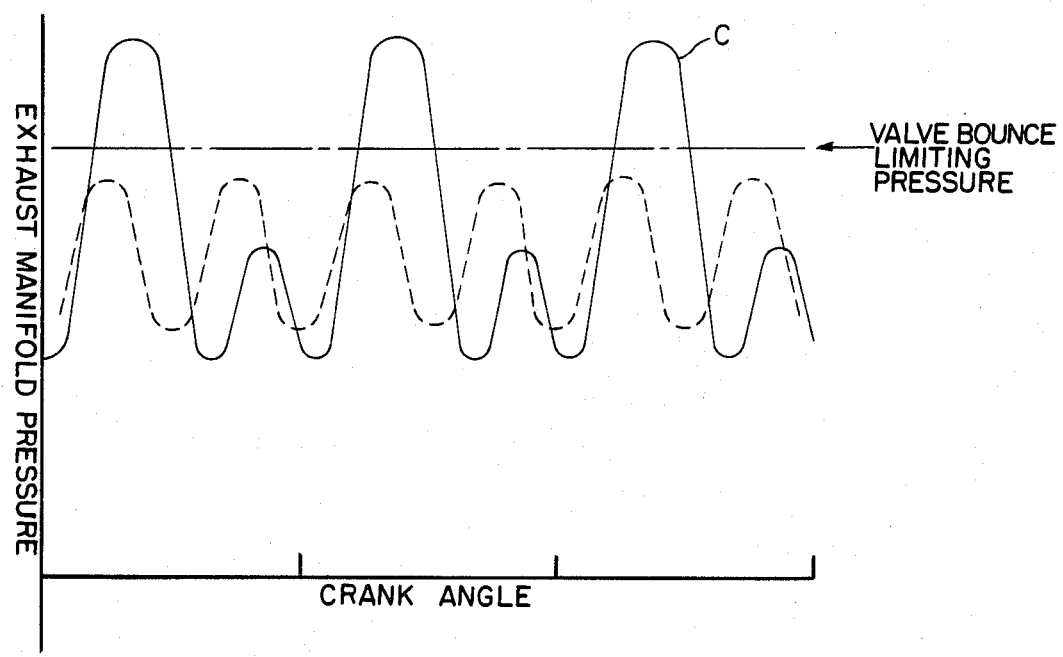

EXHAUST BRAKE VALVE

The present invention is concerned with exhaust brake valves for internal combustion engines fitted with turbines that may be used to drive the compressor of a turbocharger.

Various types of exhaust braking valves have been provided on internal combustion engines equipped with a turbocharger, to provide a means for retarding a vehicle in which the engine is installed. It does so by at least substantially blocking the engine exhaust during motoring so that the energy required to compress the air against the obstruction is translated back through the vehicle drive train to retard it. An example is that described in U.S. Pat. No. 4,138,849 in which a valve is positioned between the engine exhaust manifold and the engine turbocharger.

One shortcoming of such devices when fitted to engines having a divided exhaust manifold and a turbocharger having a twin entry turbine housing (in which each half of the divided manifold is connected to a respective turbine housing entry) is that closure of the exhaust braking valve effectively separates the two halves of the divided manifold into two small volume gas receivers. This results in a high peak exhaust manifold pressure when one cylinder exhausts into the manifold causing adjacent exhaust valves to be unseated against their normal valve spring closing force. This permits high pressure gas to be admitted through the unseated exhaust valve into a cylinder when the piston is near to the bottom of its induction stroke. The effect of this is to cause the engine to further compress the hot, high pressure gas thus admitted to the cylinder, resulting in high cylinder pressures and temperatures.

To overcome this problem it has been common practice to reduce the peak exhaust pressure in the exhaust manifold by providing gas pressure limiting means, usually by providing a leakage path for exhaust gas to a point downstream of the valve closure member. However, this effectively reduces the mean exhaust pressure in the manifold and hence the effectiveness of the device as a vehicle retarding means.

It is an object of the present invention to provide an exhaust braking valve which overcomes the aforementioned shortcomings.

In accordance with a first aspect of the present invention there is provided an exhaust brake valve for use with an internal combustion engine having a divided exhaust manifold and a turbine wheel to which two separate gas flows can be led from said divided manifold. The valve is constructed so that, in a non-exhaust braking condition, free but separate flow of the two gas paths from the divided manifold to the turbine wheel is provided but, in an exhaust braking condition, gas flow to the turbine wheel is cut off by a closure member of the valve and an interconnection between the two gas paths is provided at a location upstream of the closure member.

In accordance with a second aspect of the present invention there is provided an exhaust braking valve of the above type, wherein said valve includes a hollow section having two inlet passages for communication with the two halves of the divided exhaust manifold and two outlet passages for communication with the two inlet passages of the turbine housing. A means forming a closure member is mounted within the hollow section for selective positioning between an exhaust braking position which substantially prevents the flow of gas from the inlet to the outlet passages of the hollow section and a non-exhaust braking position which permits free flow of gas between the inlet and outlet passages of the hollow section. A means is provided for forming at least one further connecting passage between said inlet passages, said interconnecting passage means being selectively opened in response to the closure member being in the exhaust braking position and closed to prevent the flow of gas between the two inlet passages when the closure member is in the non-exhaust braking position.

The above and other related objects and features of the present invention will be apparent from a reading of the description of the accompanying drawings and the novelty thereof pointed out in the appended claims.

In the drawings:

FIG. 7 is a diagrammatic sectional view of an alternate embodiment in accordance with the invention.

FIG. 8 is a section view taken on lines VIII—VIII of FIG. 7;

FIG. 12 is a graph of exhaust manifold pressure plotted against crank angle which demonstrates the advantages of the invention.

Figure 1:
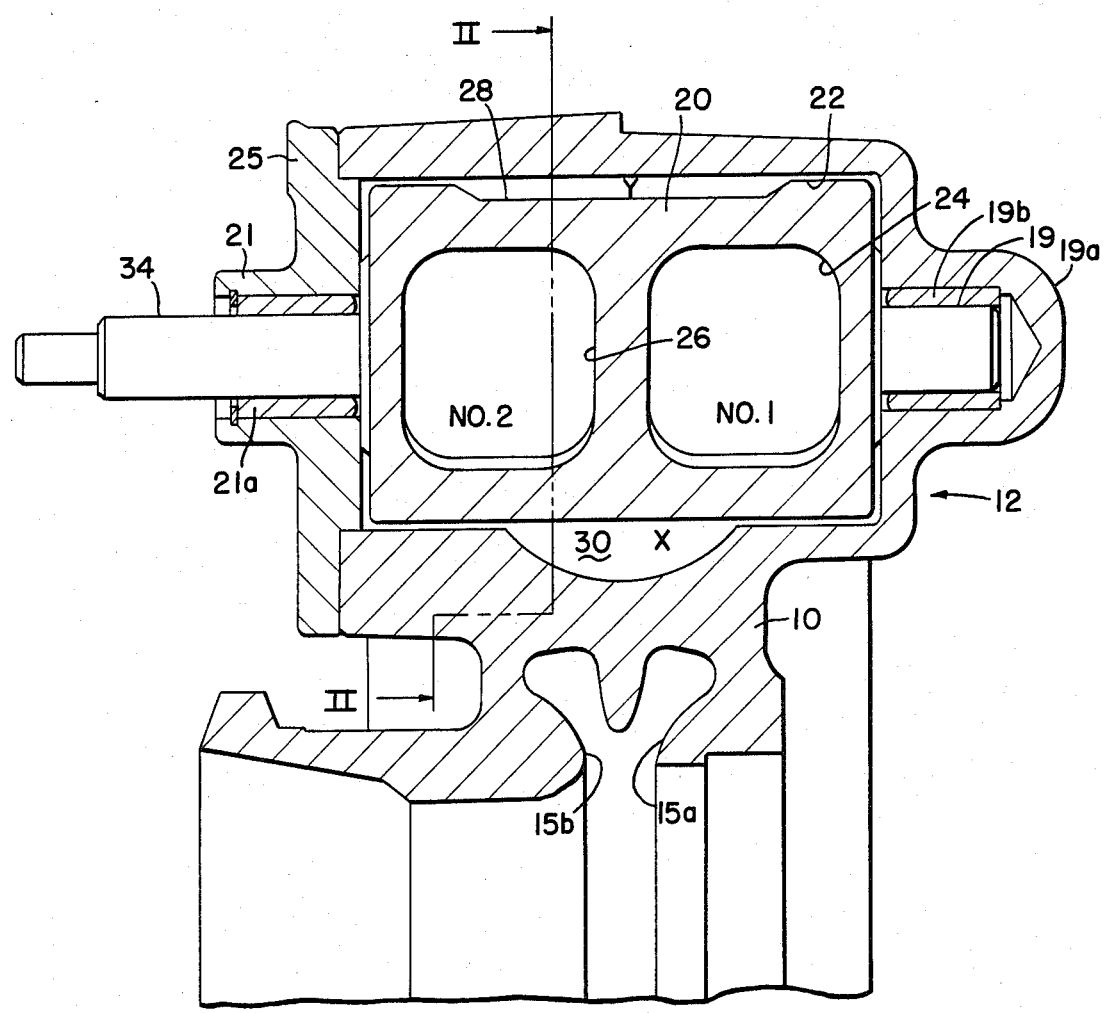
FIG. 1 is a sectional plan view of one embodiment of an exhaust brake valve in accordance with the present invention.
Figure 2:
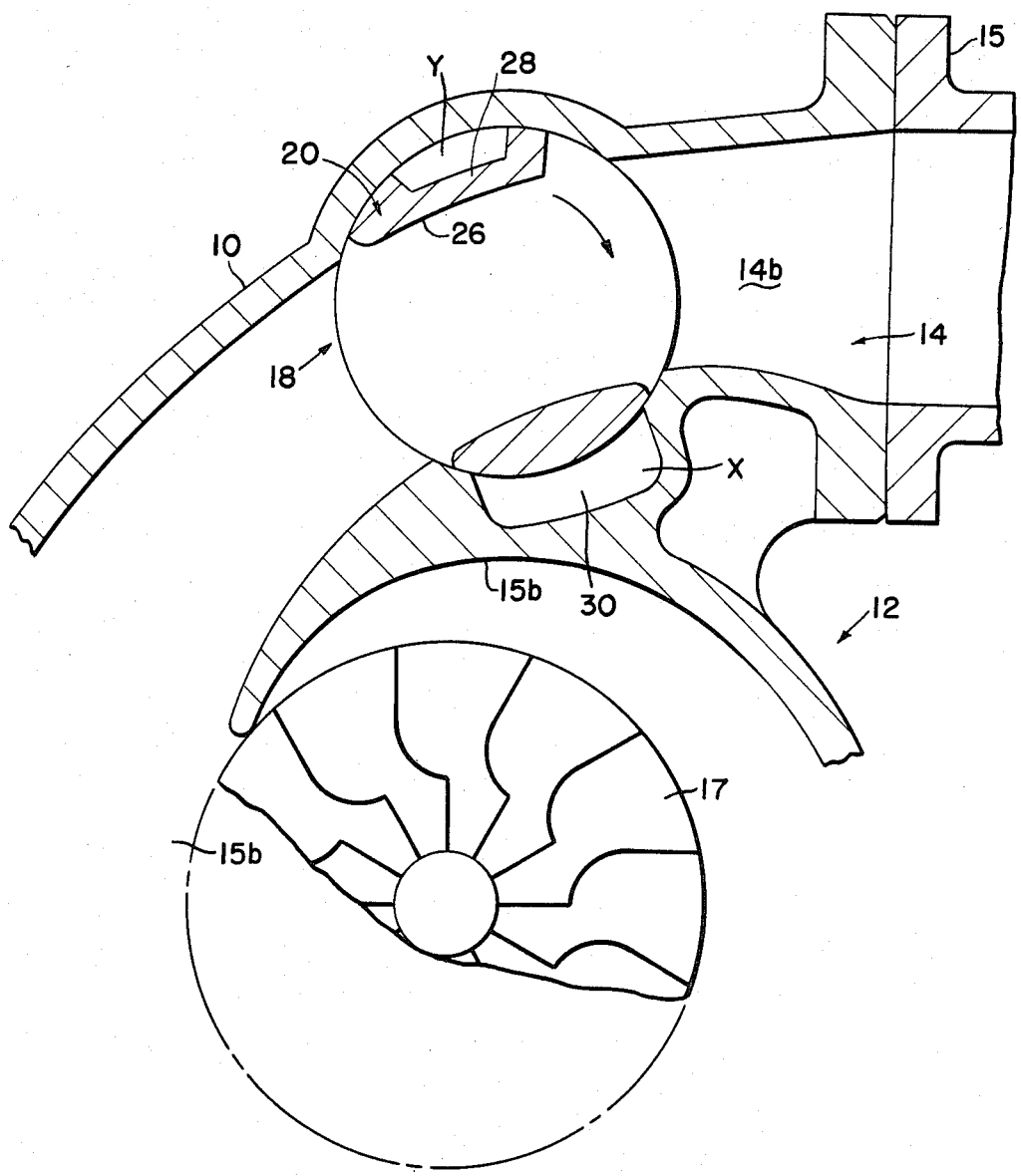
FIG. 2 is a section view taken on lines II—II of FIG. 1 with the valve open.
Figure 3:
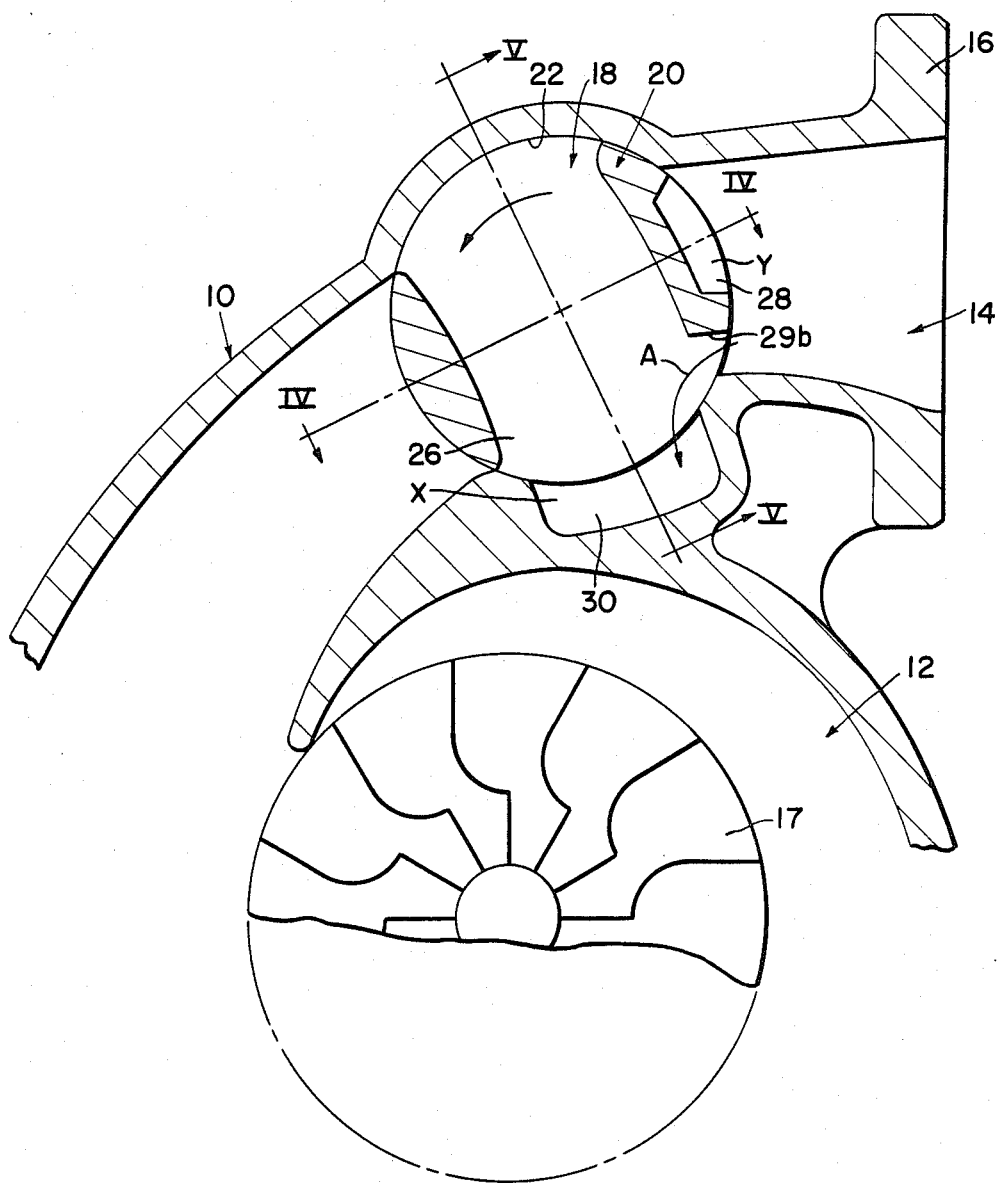
FIG. 3 is a section view taken on lines II—II of FIG. 1 with the valve closed.

As best seen in FIGS. 1, 2 and 3, the first embodiment is incorporated in the turbine housing 10 of a twin entry turbocharger 12. The housing 10 has an inlet 14 fitted with a flange 16 by which the housing can be attached to the discharge side of a divided exhaust manifold 15 (by suitable fasteners) of an internal combustion engine (not shown). The inlet 14 comprises a pair of parallel inlet passageways 14a,14b constituting the twin entry pipes to a twin entry turbocharger whereby each half of the divided manifold is connected to a respective turbine housing entry 15a and 15b for discharge across an appropriately journaled turbine wheel 17.

The passageways 14a,14b can be selectively closed by means of a valve arrangement 18 for the purpose of obtaining engine braking. In this particular embodiment, the valve is of the type having a closure member or cylindrical rotor 20 journaled in a cylindrical chamber 22 by means of integral shafts 34 and 19. Shaft 19 is journaled within a boss 19a on housing 10 by a bearing 19b. Shaft 34 extends through a boss 21 in end plate 25 to the exterior of housing 10 and is journaled by bearing 21a. End plate 25 is secured to the housing 10 by suitable screws 27 (see FIG. 6). The rotor 20 contains a pair of transversely directed through-passages 24,26 (i.e. at right angles to the longitudinal axis of rotor 20) which in the open state (second position) of the valve, as best seen in FIG. 2, form continuations of the passageways 14a,14b respectively to thereby permit free and unrestricted flow of exhaust gas from the divided manifold to the turbine wheel 17. In passing between the manifold and the turbine wheel 17, the gases in the passageways 14a,14b are kept entirely separate in this position of the valve 18.

Figure 4:
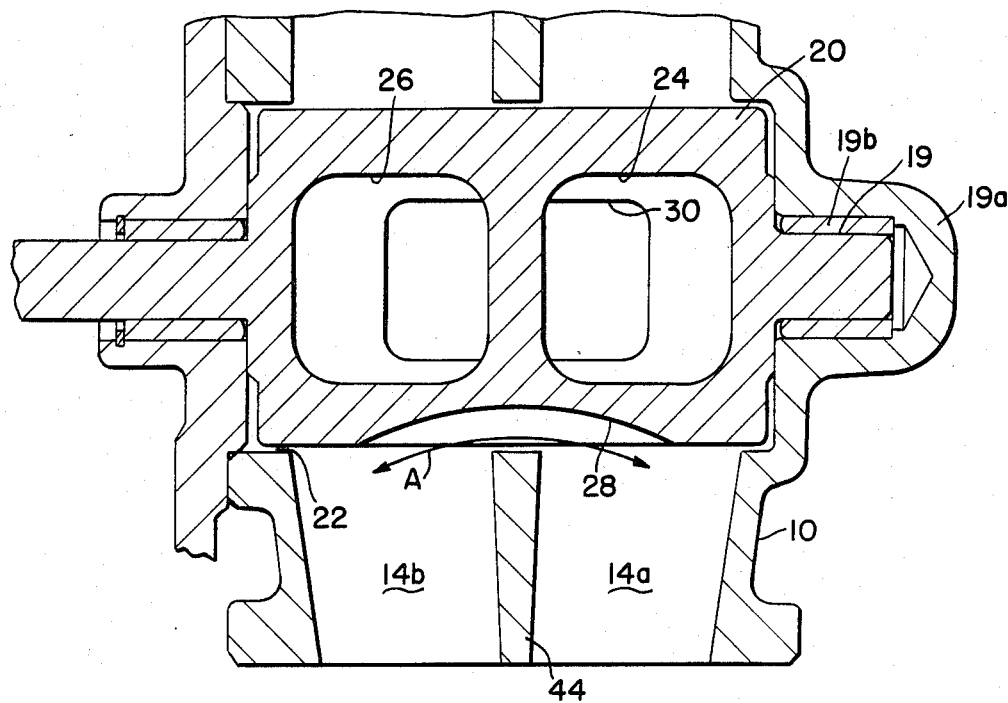
FIG. 4 is a section view taken on lines IV—IV of FIG. 3.
Figure 5:
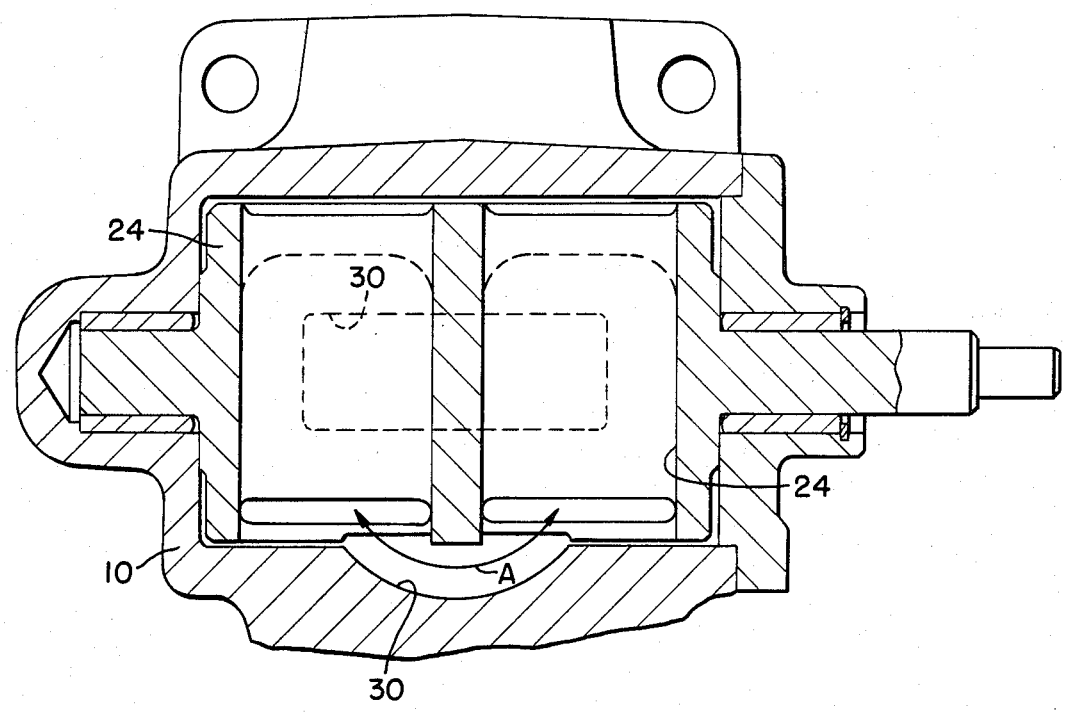
FIG. 5 is a section view taken on lines V—V of FIG. 3.

However, when the valve closure member 18 is rotated approximately 90° to its closed first position, blocking flow to turbine housing entries 15a,15b as shown in FIGS. 3, 4 and 5, the passage sections 14a,14b upstream of the valve closure member are interconnected. The cross-sectional area of the interconnection between the passage sections 14a and 14b is sized such that any restriction to the flow of gas through the interconnection does not cause the pressure pulses in either half of the divided manifold to rise above a predetermined maximum.

The desired cross-sectional area for the interconnection may be achieved by providing a single passage formed either within the valve housing 10 or within the valve closure member 20 or by means of a plurality of passages formed either within the valve housing or within the valve closure member. The desired cross-sectional area for the interconnection may also be achieved by providing a passage or passages in both the valve housing and in the valve closure member.

As illustrated in FIG. 4, one interconnection is through a recess 28 in the rotor 20 that extends laterally with respect to the gas flow into passages 14a and 14b and across a wall 44 which divides these passages. The other interconnection is by means of a similarly directed recess 30 in that part of the housing 10 forming the cylindrical side wall of the chamber 22. As best seen in FIGS. 3 and 5, the recess 30 interconnects the passages 14a,14b by way of the rotor passages 24,26, which, in the position shown in FIGS. 3 and 5, are arranged to remain in partial communication with the respective passage portions 14a,14b by means of truncated lips 29a and 29b, respectively. This path is indicated by the arrow A in FIG. 3.

Thus, by this means, a flow of gas between the two passages 14a,14b is permitted when the closure member 20 is in its closed position in which it cuts off the gas flow to the turbine 17.

Figure 6:
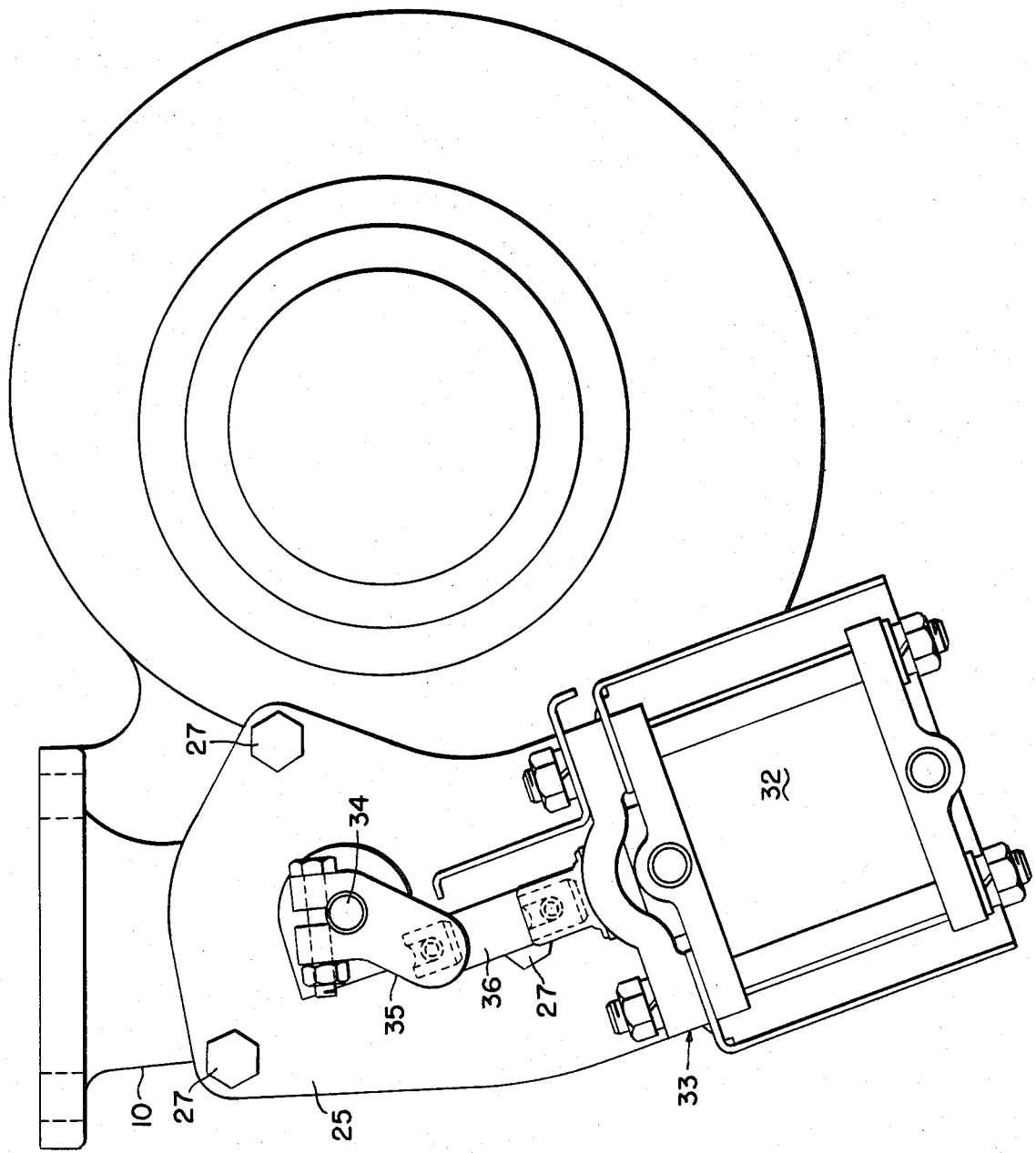
FIG. 6 is an external plan view showing one actuating mechanism for the valve.

One possible mechanism for controlling the actuation of the valve is shown in FIG. 6 and uses an externally mounted actuator cylinder or solenoid 32 mounted on end plate 25 through frame 33 to rotate the shaft 34 of the rotor 18 through approximately 90° by way of a linkage 36 and crank arm 35 clamped to shaft 34 in a manner similar to that described in the aforementioned U.S. Pat. No. 4,183,849.

FIGS. 7 and 8 show another embodiment wherein the closure member 20 of FIGS. 1 to 5 is replaced by a butterfly valve 40 mounted on spindles 41a and 41b which are journaled in housing 10 by bearings 43 so that the valve 40 pivots about an axis contained substantially within the plane of dividing wall 44' in response to displacement of a crank arm 45 connected to spindle 41a. The valve 10 in its open position (second position), illustrated by dashed lines in FIG. 7, is arranged to fully occupy an aperture 42 in the wall 44' which separates the passageways 14a,14b but which, in the closed position of the valve shown in solid lines, leaves an open connection via one half of the aperture 42 which allows the passages 14a,14b to freely communicate, as indicated by the arrows B in FIG. 7. A suitable actuator mechanism is connected to the crank arm 45 to pivot valve 40 between its positions.

Figure 10:
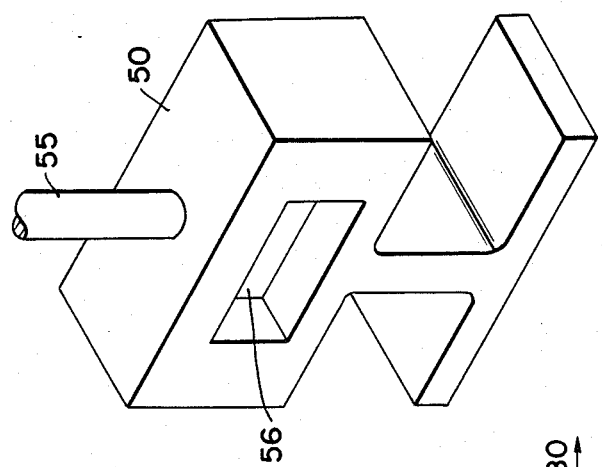
FIG. 10 is a perspective view of a valve element of the embodiment of FIG. 9.
Figure 9:
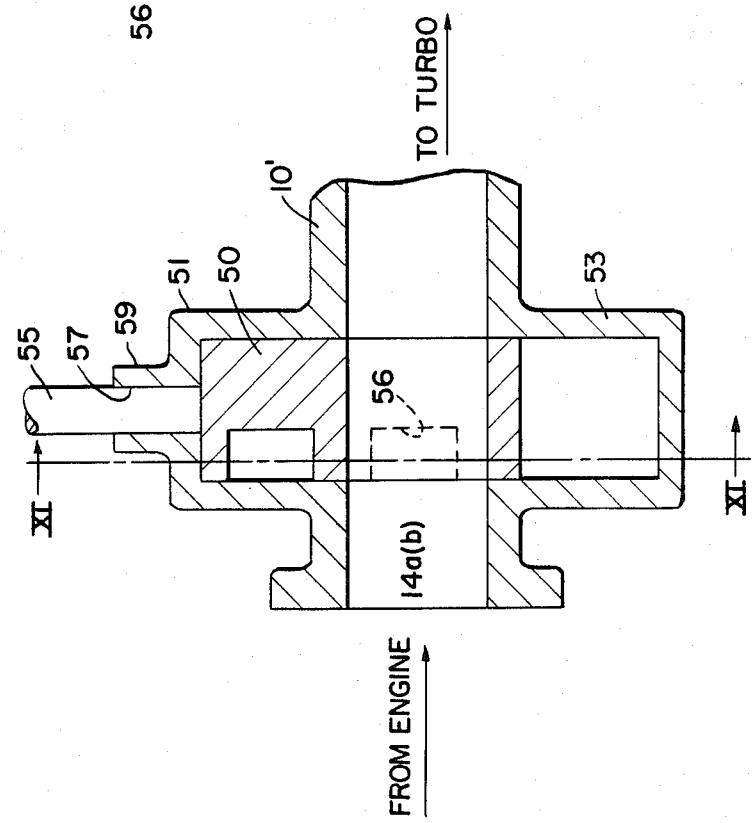
FIG. 9 is a sectional view of a third embodiment in accordance with the invention.
Figure 11:
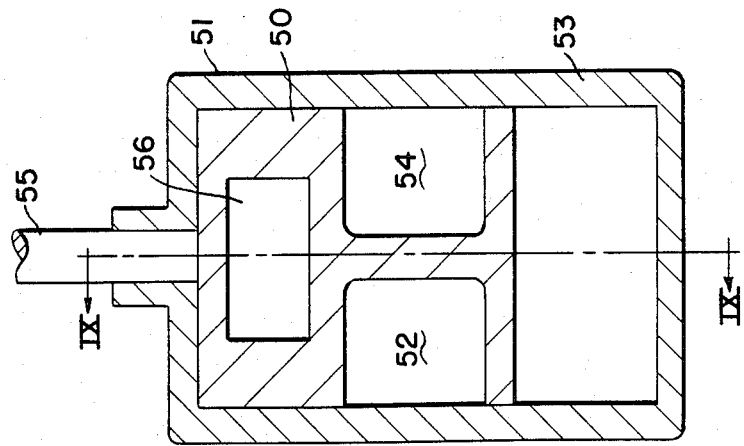
FIG. 11 is a section view taken on lines XI—XI of FIG. 9.

FIGS. 9 and 10 show a further alternative where the rotary valve of FIGS. 1 to 5 is replaced by a linear guillotine valve. The latter arrangement uses a sliding gate member 50 adapted to slide in a direction transversely to the passageways 14a'',14b'' in chambers 51 and 53 which are integral with and extend outward from housing 10''. A shaft 55 extends through an opening 57 in boss 59 extending from chamber 51. In the open position of the valve (second position), the gate member provides a pair of passages 52,54 which allow free flow of gas along the passageways 14a'',14b'' to the turbine. However, in the closed position (first position) of the valve, a recess 56 in the gate member 50 allows communication between the passages 14a'',14b'' while cutting off all gas flow to the turbine wheel.

All of the embodiments described above provide a dramatic reduction in the peak pressures experienced in the exhaust manifold. To illustrate this phenomenon, the curve of FIG. 12 shows exhaust manifold pressure plotted against crank angle resulting from three cylinders of a six cylinder engine exhausting into one half of a divided manifold. The curve C with the higher peaks is that which results when an exhaust brake valve is used that effectively separates the exhaust manifold into two discrete sections. The curve C with approximately equal peaks is that which results when an exhaust braking valve is used which provides a connection between the two halves of the manifold as proposed herein. This effectively doubles the volume into which each cylinder exhausts and hence produces lower peak pressures. Similar conditions exist within each half of a divided exhaust manifold for any multi-cylinder engine.

The effect of this is to reduce the peak pressure to a valve below that which is capable of unseating exhaust valves and at the same time to increase the mean value of the exhaust manifold pressure. This means that each cylinder is exhausting against a higher manifold pressure which effectively increases the braking effect of the engine on the vehicle. At the same time, cylinder temperatures are reduced compared with the condition where no interconnection is provided.

While a preferred embodiment of the present invention has been described it should be apparent to those skilled in the art that it may be practiced in other forms without departing from the spirit and scope thereof.

Having thus described the invention what is claimed as novel and desired to be secured by the Patent Laws of the United States is:

1. An exhaust brake valve for use with an internal combustion engine having a divided exhaust manifold and a turbine having a turbine wheel to which separate gas flows can be led from the divided manifold, said valve comprising;
    means forming a hollow section of cylindrical configuration having two inlet passages for communicating with the two halves of the divided exhaust manifold and two outlet passages for communication with the two inlet passages of the turbine housing,
    means forming a cylindrical rotor closure member having a pair of through passages and journalled for rotation within the cylindrical hollow section for selective positioning between a first position which substantially prevents the flow of gas from the inlet to the outlet passages of the hollow section and a second position which permits free flow of gas between the inlet and outlet passages of the hollow section through said pair of through passages; and, means for forming at least one interconnecting passage between said inlet passages, said interconnecting passage means being selectively opened in response to the closure member being in said first position, and closed when said closure member is in said second position.

2. Apparatus as in claim 1 wherein said interconnecting passage means comprises means for forming a flowpath in at least one of the rotor and the hollow section of said valve, said flowpath means being oriented to connect said inlet passages when said rotor is in the first position and to block flow when the rotor is rotated to said second position.

3. Apparatus as in claim 2 wherein said flowpath means comprises a recess in the walls of said hollow section of said valve, said rotor cooperating with said recess to block it off in said second position and to expose it to said inlet passages in said first position.

4. Apparatus as in claim 3 wherein said rotor has a lip formed to connect each of said inlet passages to said recess when said rotor is in said first position.

5. Apparatus as in claim 2 wherein said flowpath inlet passages are separated by a dividing wall and said means comprises a recess formed in said rotor and oriented to extend between said inlet passages and across said dividing wall when said rotor is in said first position.

6. Apparatus as in claim 3 wherein said inlet passages are separated by a dividing wall and said flow path means comprises a recess formed in said rotor and oriented to extend between said inlet passages and across said dividing wall when said rotor is in said first position whereby said inlet passages are interconnected through two parallel flowpaths.

7. Apparatus as in claim 1 wherein the axis of said rotor is at right angles to and lies generally in the plane of the longitudinal axis of the inlet and outlet passages in said valve.

8. Apparatus as in claim 1 further comprising an actuator externally mounted on said valve and connected to said rotor for selectively rotating said rotor between its first and second positions.

9. An exhaust brake valve for use with an internal combustion engine having a divided exhaust manifold and a turbine having a turbine wheel to which separate gas flows can be led from the divided manifold, said valve comprising, means forming a hollow section having two inlet passages for communicating with the two halves of the divided exhaust manifold and two outlet passages for communication with the two inlet passages of the turbine housing, means for forming a closure member means comprising a sliding gate member displaceable in said hollow section forming means between first and second positions, the first position substantially preventing the flow of gas from the inlet to the outlet passages of said hollow section and the second position permitting free flow therethrough, said gate member having a pair of through passages, which in the second position of said closure member, permit free and separate flow between the sets of passages, said gate member further having a recess oriented to extend between and interconnect said inlet passages when said closure member is in said first position.

10. Apparatus as in claim 9 wherein said gate member is displaceable in a direction at approximately a right angle to the direction of flow through said valve.

* * * * *